US 8,615,600 B2

(12) United States Patent
Britt et al.

(10) Patent No.: US 8,615,600 B2
(45) Date of Patent: Dec. 24, 2013

(54) COMMUNICATION BETWEEN A HOST OPERATING SYSTEM AND A GUEST OPERATING SYSTEM

(75) Inventors: Michael W. Britt, Rochester, MN (US); Christopher T. Gloe, Rochester, MN (US); Chris M. Mwarabu, Rochester, MN (US); Thomas P. Pitzen, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 303 days.

(21) Appl. No.: 12/894,393

(22) Filed: Sep. 30, 2010

(65) Prior Publication Data

US 2012/0084458 A1    Apr. 5, 2012

(51) Int. Cl.
*G06F 15/16* (2006.01)
(52) U.S. Cl.
USPC ............... 709/236; 709/238; 709/237
(58) Field of Classification Search
USPC ............ 709/236, 237, 238, 224, 241
See application file for complete search history.

(56) References Cited

U.S. PATENT DOCUMENTS

| 7,962,647 | B2* | 6/2011 | Suri et al. ............... 709/238 |
| 8,006,079 | B2* | 8/2011 | Goodson et al. .......... 713/1 |
| 2007/0061492 | A1* | 3/2007 | van Riel .................. 710/3 |
| 2008/0270825 | A1* | 10/2008 | Goodson et al. .......... 714/6 |
| 2009/0055507 | A1* | 2/2009 | Oeda ..................... 709/216 |
| 2009/0094603 | A1* | 4/2009 | Hiltgen et al. ............ 718/1 |
| 2009/0113420 | A1* | 4/2009 | Pawlowski ............... 718/1 |
| 2010/0175108 | A1* | 7/2010 | Protas |
| 2010/0306358 | A1* | 12/2010 | Droux et al. ............. 709/223 |
| 2011/0197205 | A1* | 8/2011 | Wagner et al. ........... 719/316 |

OTHER PUBLICATIONS

VMchannel Requirements—KVM, http://www.linux-kvm.org/page/VMchannel_Requirements, printed Sep. 30, 2010, pp. 1-5.
Networking—KVM, http://www.linux-kvm.org/page/Networking, printed Sep. 30, 2010, pp. 1-6.
R. Hinden and S. Deering, Request for Comments 4291, IP Version 6 Addressing Architecture, http://www.ietf.org/rfc/rfc4291.txt, Feb. 2006, pp. 1-24, The Internet Society.
S. Thompson, T. Narten, Request for Comments 2462, IPv6 Stateless Address Autoconfiguration, http://www.ietf.org/rfc/rfc2462.txt, Dec. 2008, pp. 1-24, The Internet Society.

* cited by examiner

*Primary Examiner* — Dhairya A Patel
(74) *Attorney, Agent, or Firm* — Owen J. Gamon

(57) ABSTRACT

In an embodiment, a guest operating system receives first host network information that identifies a host virtual network adapter. The first host network information uniquely identifies the host virtual network adapter. The guest operating system sends a first frame that comprises the first host network information to a guest virtual network adapter. The guest virtual network adapter sends the first frame to the host virtual network adapter. The guest operating system receives second host network information that identifies the host virtual network adapter. The second host network information uniquely identifies the host virtual network adapter. The guest operating system sends a second frame that comprises the second host network information to the guest virtual network adapter. The guest virtual network adapter sends the second frame to the host virtual network adapter identified by the second host network information in the second frame.

12 Claims, 7 Drawing Sheets

COMMUNICATION BETWEEN A HOST OPERATING SYSTEM AND A GUEST OPERATING SYSTEM

FIELD

An embodiment of the invention generally relates to computer systems and more particularly to communication between host and guest computer operating systems in a computer system.

BACKGROUND

Computer systems typically comprise a combination of computer programs and hardware, such as semiconductors, transistors, chips, and circuit boards. The computer programs are stored in the storage devices and are executed by the processors.

One use of computers is for the implementation of virtual machines, which execute on a physical machine. A virtual machine (VM) is a program implementation of a physical machine that executes programs. Virtual machines allow the sharing of physical machine resources between different virtual machines, each running its own operating system (typically called guest operating systems), which may be the same or different from each other. Virtual machines may allow multiple operating system environments to co-exist on the same computer, in isolation from each other. Virtual machines may provide an instruction set architecture that is somewhat different from that of the underlying physical machine.

SUMMARY

A method, computer-readable storage medium, and computer system are provided. In an embodiment, a guest operating system at a computer receives first host network information that identifies a host virtual network adapter that executes in the computer. The first host network information uniquely identifies the host virtual network adapter in a network that is connected to the computer. The guest operating system sends a first frame that comprises the first host network information to a guest virtual network adapter that executes in the computer. The guest virtual network adapter sends the first frame to the host virtual network adapter identified by the first host network information in the first frame. The guest operating system receives second host network information that identifies the host virtual network adapter. The second host network information uniquely identifies the host virtual network adapter in the network. The guest operating system sends a second frame that comprises the second host network information to the guest virtual network adapter. The guest virtual network adapter sends the second frame to the host virtual network adapter identified by the second host network information in the second frame.

It is to be noted, however, that the appended drawings illustrate only example embodiments of the invention, and are therefore not considered a limitation of the scope of other embodiments of the invention.

DETAILED DESCRIPTION

Figure 1:
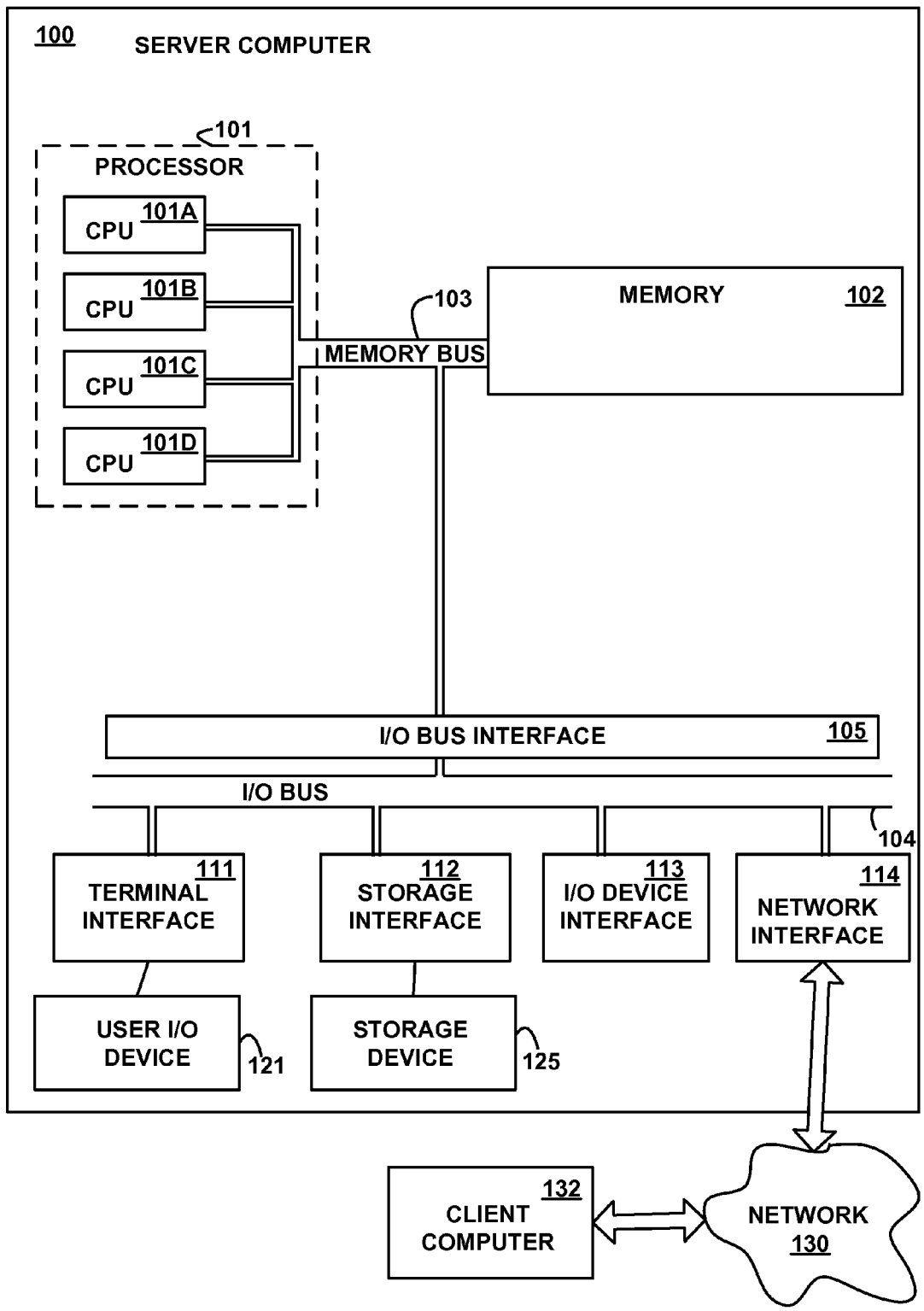
FIG. 1 depicts a high-level block diagram of an example system for implementing an embodiment of the invention.

An embodiment of the invention establishes a communications channel between a host and virtual guest operating systems through which network information is shared. This communications channel enables changes to the network information to be shared even when changes to the networking information might disrupt communications using the network information. Applications executing using the host and guest operating systems are thus enabled to use the network information to communicate using desired networking protocols and to be notified of changes to the network information. Referring to the Drawings, wherein like numbers denote like parts throughout the several views, FIG. 1 depicts a high-level block diagram representation of a server computer system 100 connected to a client computer system 132 via a network 130, according to an embodiment of the present invention. The term "server" is used herein for convenience only, and in various embodiments a computer system that operates as a client computer in one environment may operate as a server computer in another environment, and vice versa. The mechanisms and apparatus of embodiments of the present invention apply equally to any appropriate computing system.

The major components of the computer system 100 comprise one or more processors 101, a main memory 102, a terminal interface 111, a storage interface 112, an I/O (Input/Output) device interface 113, and a network adapter 114, all of which are communicatively coupled, directly or indirectly, for inter-component communication via a memory bus 103, an I/O bus 104, and an I/O bus interface unit 105.

The computer system 100 contains one or more general-purpose programmable central processing units (CPUs)

101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may comprise one or more levels of on-board cache.

In an embodiment, the main memory 102 may comprise a random-access semiconductor memory, storage device, or storage medium for storing or encoding data and programs. In another embodiment, the main memory 102 represents the entire virtual memory of the computer system 100, and may also include the virtual memory of other computer systems coupled to the computer system 100 or connected via the network 130. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104.

The I/O interface units support communication with a variety of storage and I/O devices. For example, the terminal interface unit 111 supports the attachment of one or more user I/O devices 121, which may comprise user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 121 and the computer system 100, and may receive output data via the user output devices. For example, a user interface may be presented via the user I/O device 121, such as displayed on a display device, played via a speaker, or printed via a printer.

The storage interface unit 112 supports the attachment of one or more disk drives or direct access storage devices 125 (which are typically rotating magnetic disk drive storage devices, although they could alternatively be other storage devices, including arrays of disk drives configured to appear as a single large storage device to a host computer). In another embodiment, the storage device 125 may be implemented via any type of secondary storage device. The contents of the main memory 102, or any portion thereof, may be stored to and retrieved from the storage device 125, as needed. The I/O device interface 113 provides an interface to any of various other input/output devices or devices of other types, such as printers or fax machines. The network adapter 114 provides one or more communications paths from the computer system 100 to other digital devices and computer systems 132; such paths may comprise, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may, in fact, contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 is implemented as a desktop computer, portable computer, laptop or notebook computer, tablet computer, pocket computer, telephone, smart phone, pager, automobile, teleconferencing system, appliance, or any other appropriate type of electronic device.

The network 130 may be any suitable network or combination of networks and may support any appropriate protocol suitable for communication of data and/or code to/from the computer system 100 and the computer system 132. In various embodiments, the network 130 may represent a storage device or a combination of storage devices, either connected directly or indirectly to the computer system 100. In another embodiment, the network 130 may support wireless communications. In another embodiment, the network 130 may support hard-wired communications, such as a telephone line or cable. In another embodiment, the network 130 may be the Internet and may support IP (Internet Protocol). In another embodiment, the network 130 is implemented as a local area network (LAN) or a wide area network (WAN). In another embodiment, the network 130 is implemented as a hotspot service provider network. In another embodiment, the network 130 is implemented an intranet. In another embodiment, the network 130 is implemented as any appropriate cellular data network, cell-based radio network technology, or wireless network. In another embodiment, the network 130 is implemented as any suitable network or combination of networks. Although one network 130 is shown, in other embodiments any number of networks (of the same or different types) may be present.

FIG. 1 is intended to depict the representative major components of the computer system 100 and the network 130. But, individual components may have greater complexity than represented in FIG. 1, components other than or in addition to those shown in FIG. 1 may be present, and the number, type, and configuration of such components may vary. Several particular examples of such additional complexity or additional variations are disclosed herein; these are by way of example only and are not necessarily the only such variations. The various program components illustrated in FIG. 1 and implementing various embodiments of the invention may be implemented in a number of manners, including using various computer applications, routines, components, programs, objects, modules, data structures, etc., and are referred to hereinafter as "computer programs," or simply "programs."

The computer programs comprise one or more instructions or statements that are resident at various times in various memory and storage devices in the computer system 100 and that, when read and executed by one or more processors in the computer system 100 or when interpreted by instructions that are executed by one or more processors, cause the computer system 100 to perform the actions necessary to execute steps or elements comprising the various aspects of embodiments of the invention. Aspects of embodiments of the invention may be embodied as a system, method, or computer program product. Accordingly, aspects of embodiments of the invention may take the form of an entirely hardware embodiment, an entirely program embodiment (including firmware, resident programs, micro-code, etc., which are stored in a storage device) or an embodiment combining program and hardware aspects that may all generally be referred to herein as a "circuit," "module," or "system." Further, embodiments of the invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (an non-exhaustive list) of the computer-readable storage media may comprise: an electrical connection having one or more wires, a portable computer diskette, a hard disk (e.g., the storage device 125), a random access memory (RAM) (e.g., the memory 102), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, Radio Frequency, or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the invention are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks.

The computer programs defining the functions of various embodiments of the invention may be delivered to a computer system via a variety of tangible computer-readable storage media that may be operatively or communicatively connected (directly or indirectly) to the processor or processors. The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which comprises one or more executable instructions for implementing the specified logical function(s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the invention may also be delivered as part of a service engagement with a client corporation, non-profit organization, government entity, or internal organizational structure. Aspects of these embodiments may comprise configuring a computer system to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described hereinafter may be identified based upon the application for which they are implemented in a specific embodiment of the invention. But, any particular program nomenclature that follows is used merely for convenience, and thus embodiments of the invention are not limited to use solely in any specific application identified and/or implied by such nomenclature. The exemplary environments illustrated in FIG. 1 are not intended to limit the present invention. Indeed, other alternative hardware and/or program environments may be used without departing from the scope of embodiments the invention.

Figure 2:
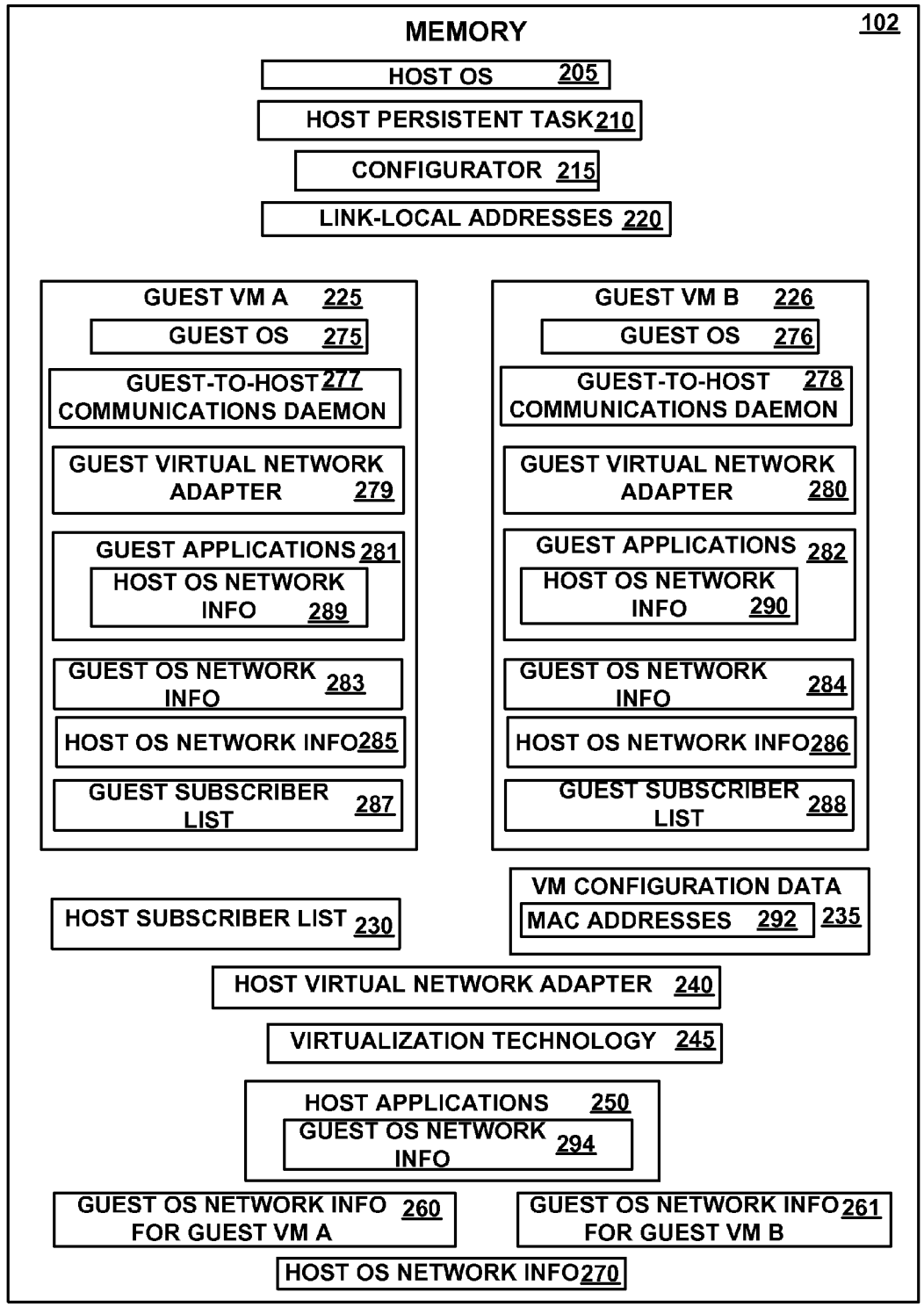
FIG. 2 depicts a block diagram of example contents of memory, according to an embodiment of the invention.

FIG. 2 depicts a block diagram of example contents of the memory 102, according to an embodiment of the invention. The memory 102 stores or encodes a host operating system 205, a host persistent task 210, a configurator 215, link-local addresses 220, guest virtual machines 225 and 226, a host subscriber list 230, virtual machine configuration data 235, a host virtual network adapter 240, virtualization technology 245, host applications 250, guest operating system network information 260 and 261 for the respective guest virtual machines 225 and 226, and host operating system network information 270.

Although the host operating system 205, the host persistent task 210, the configurator 215, the link-local addresses 220, the guest virtual machine A 225, the guest virtual machine B 226, the host subscriber list 230, the virtual machine configuration data 235, the host virtual network adapter 240, the virtualization technology 245, the host applications 250, the guest operating system network information 260 for the guest virtual machine A, the guest operating system network information 261 for the guest virtual machine B, and the host operating system network information 270 are illustrated as being contained within the memory 102, in other embodiments some or all of them may be on different computer systems and may be accessed remotely, e.g., via the network 130.

The computer system 100 may use virtual addressing mechanisms that allow the programs of the computer system 100 to behave as if they only have access to a large, single storage entity instead of access to multiple, smaller storage entities. Thus, while the host operating system 205, the host persistent task 210, the configurator 215, the link-local addresses 220, the guest virtual machine A 225, the guest virtual machine B 226, the host subscriber list 230, the virtual machine configuration data 235, the host virtual network adapter 240, the virtualization technology 245, the host applications 250, the guest operating system network information 260 for the guest virtual machine A, the guest operating system network information 261 for the guest virtual machine B, and the host operating system network information 270 are illustrated as being contained within the main memory 102, these elements are not necessarily all completely contained in the same storage device at the same time. Further, although the host operating system 205, the host persistent task 210, the configurator 215, the link-local addresses 220, the guest virtual machine A 225, the guest virtual machine B 226, the host subscriber list 230, the virtual machine configuration data 235, the host virtual network adapter 240, the virtualization technology 245, the host applications 250, the guest operating system network information 260 for the guest virtual machine A, the guest operating system network information 261 for the guest virtual machine B, and the host operating system network information 270 are illustrated as being separate entities, in other embodiments some of them, portions of some of them, or all of them may be packaged together. By way of illustration and not of limitation, in an embodiment, the host persistent task 210 may be part of the host operating system 205.

In an embodiment, the host operating system 205, the host persistent task 210, the configurator 215, the guest virtual machine A 225, the guest virtual machine B 226, the host virtual network adapter 240, the virtualization technology 245, and/or the host applications 250 comprise instructions or statements that execute on the processor 101 or instructions or statements that are interpreted by instructions or statements that execute on the processor 101, to carry out the functions as further described below with reference to FIGS. 3, 4, 5, 6, 7, 8, 9, 10, 11, and 12. In another embodiment, the host operating system 205, the host persistent task 210, the configurator 215, the guest virtual machine A 225, the guest virtual machine B 226, the host virtual network adapter 240, the virtualization technology 245, and/or the host applications 250 are implemented in hardware via semiconductor devices, chips, logical gates, circuits, circuit cards, and/or other physical hardware devices in lieu of, or in addition to, a processor-based system. In an embodiment, the host operating system 205, the host persistent task 210, the configurator 215, the guest virtual machine A 225, the guest virtual machine B 226, the host virtual network adapter 240, the virtualization technology 245, and/or the host applications 250 comprise data in addition to instructions or statements.

The guest virtual machine A 225 and the guest virtual machine B 226 comprise respective guest operating systems 275 and 276, respective guest-to-host communication daemons 277 and 278, respective guest virtual network adapters 279 and 280, respective guest applications 281 and 282, respective guest operating system network information 283 and 284, respective host operating system network information 285 and 286, and respective guest subscriber lists 287 and 288. The guest applications 281 and 282 comprise respective host operating system network information 289 and 290. The virtual machine configuration data 235 comprises one or more guest MAC (Media Access Control) addresses 292. The host applications 250 comprise guest operating system network information 294.

The host operating system 205 controls the operation of the computer system 100 and manages the hardware of the computer system 100. The host operating system 205 is invoked by various host application programs, e.g., the host applications 250, to access common functions and hardware services. The guest applications 281 and 282 do not invoke the host operating system 205. Instead, the guest applications 281 and 282 invoke their respective guest operating systems 275 and 276, which control the operation of their respective guest virtual machines 225 and 226. The host applications 250 and guest applications 281 and 282 may be user applications, third-party applications, or any other appropriate programs comprising instructions that execute on the processor 101 or statements that are interpreted by instructions that execute on the processor 101.

The guest virtual machines 225 and 226 enable the single physical computer 100 to operate essentially like multiple and independent virtual computers (referred to as virtual machines), with the various resources in the physical computer (e.g., processors, memory, data structures, and input/output devices) allocated among the various virtual machines. Each virtual machine may execute a separate operating system (which may be the same or a different operating system from the other virtual machines). From the perspective of users and of the programs executing in the virtual machine, each virtual machine operates as a fully independent computer.

The link-local addresses 220 are network addresses that uniquely identify the guest virtual network adapters 279 and 280 within the computer system 100, but do not necessarily uniquely identify the guest virtual network adapters 279 and 280 within the network 130. In an embodiment, the computer system 100 uses the link-local addresses 220 for communication with other devices on the same LAN segment as the computer system 100, but not for network communication with other devices that are not connected to the same LAN segment as the computer system 100. In various embodiments, a LAN segment is a single cable and any devices connected to the cable; a portion of a LAN in which devices can access each other using a data link layer protocol (e.g., the ability to send a packet to other devices using the devices' MAC addresses); or a section of a LAN that is separated from the rest of the LAN by a bridge, router or switch.

The virtual network adapters 240, 279, and 280 are programs (as opposed to physical network adapters) that connect the computer 100 to the network 130 and that connect the guest virtual machines 225 and 226 to each other and to the host operating system 205. The host operating system 205 uses the host virtual network adapter 240 to communicate to the guest virtual machines 225 and 226. The guest operating systems 275 and 276 use their respective guest virtual network adapters 279 and 280 to communicate to the host operating system 205.

In an embodiment, the guest operating system network information 260, 283, and 294 for the guest virtual machine A 225 comprise host fully qualified domain names of the guest virtual network adapter 279, a network address of the host virtual network adapter for the guest virtual network adapter 279, and a subnet mask. (The guest operating system network information 294 may identify one or both of the guest virtual network adapters 279 and 280.) A subnet mask is a number used to determine what subnet a network address belongs to by performing a bitwise AND operation on the subnet mask and the network address, which yields a routing prefix that identifies the subnet. A subnet is a logical subdivision of a network, where all computers that belong to a particular subnet have network addresses that comprise an identical common, most-significant bit-group in their network address, called the routing prefix. In other embodiments, the operating system network information may comprise a port identifier, a password, authority information, or any other appropriate information useful to applications desiring to communicate with applications in other operating systems.

A host fully qualified domain name and a network address uniquely identify the guest virtual network adapter 279 within the computer system 100 and within the network 130. Thus, no other virtual network adapter, physical network adapter, or network device connected to the network 130 has the same host fully qualified domain name as the guest operating system network information 260 and 283, and no other virtual network adapter, physical network adapter, or network device connected to the network 130 has the same network address.

In an embodiment, the guest operating system network information 261, 284, and 294 for the guest virtual machine B 226 comprise host fully qualified domain names of the guest virtual network adapter 280, a network address of the guest virtual network adapter 280, and a subnet mask. (The guest operating system network information 294 may identify one or both of the guest virtual network adapters 279 and 280.) A host fully qualified domain name and a network address uniquely identify the guest virtual network adapter 280 within the computer system 100 and within the network 130.

In an embodiment, the host operating system network information 270, 285, 286, 289, and 290 comprise host fully qualified domain names of the host virtual network adapter 240, a network address of the host virtual network adapter 240, and a subnet mask. A host fully qualified domain name and a network address uniquely identify the host virtual network adapter 240 within the computer system 100 and within the network 130.

In an embodiment, the operating system network information 260, 261, 283, 284, 285, 286, 289, 290, and 294 are stored in a persistent store, i.e., a storage device that retains its contents after the storage device loses electrical power.

The guest MAC address 292 is a serial number or identifier that uniquely identifies each guest virtual network adapter amongst all virtual and physical network adapters that exist in the server computer 100 and that are connected to the network 130. But, the guest MAC address 292 does not specify the location of the guest virtual network adapter within the network 130; i.e., the guest MAC address 292 is not a network address, in that it is not sufficient to allow an entity that knows the guest MAC address 292 to find the guest virtual network adapter on the network 130 and to send and receive data to/from the guest virtual network adapter via the network 130.

Figure 3:
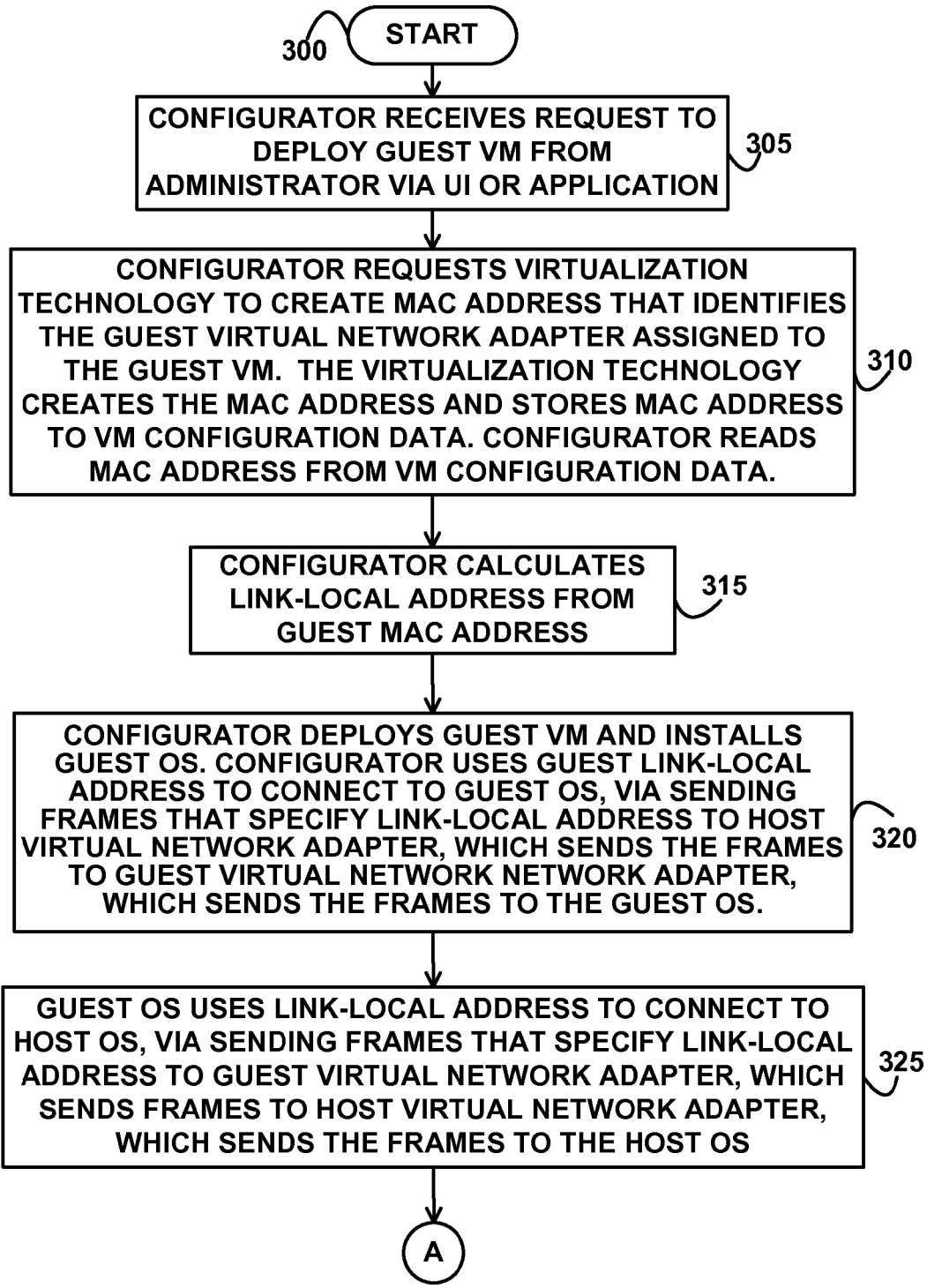
FIG. 3 depicts a flowchart of example processing for deployment of virtual machines and connection via a link-local address, according to an embodiment of the invention.
Figure 4:
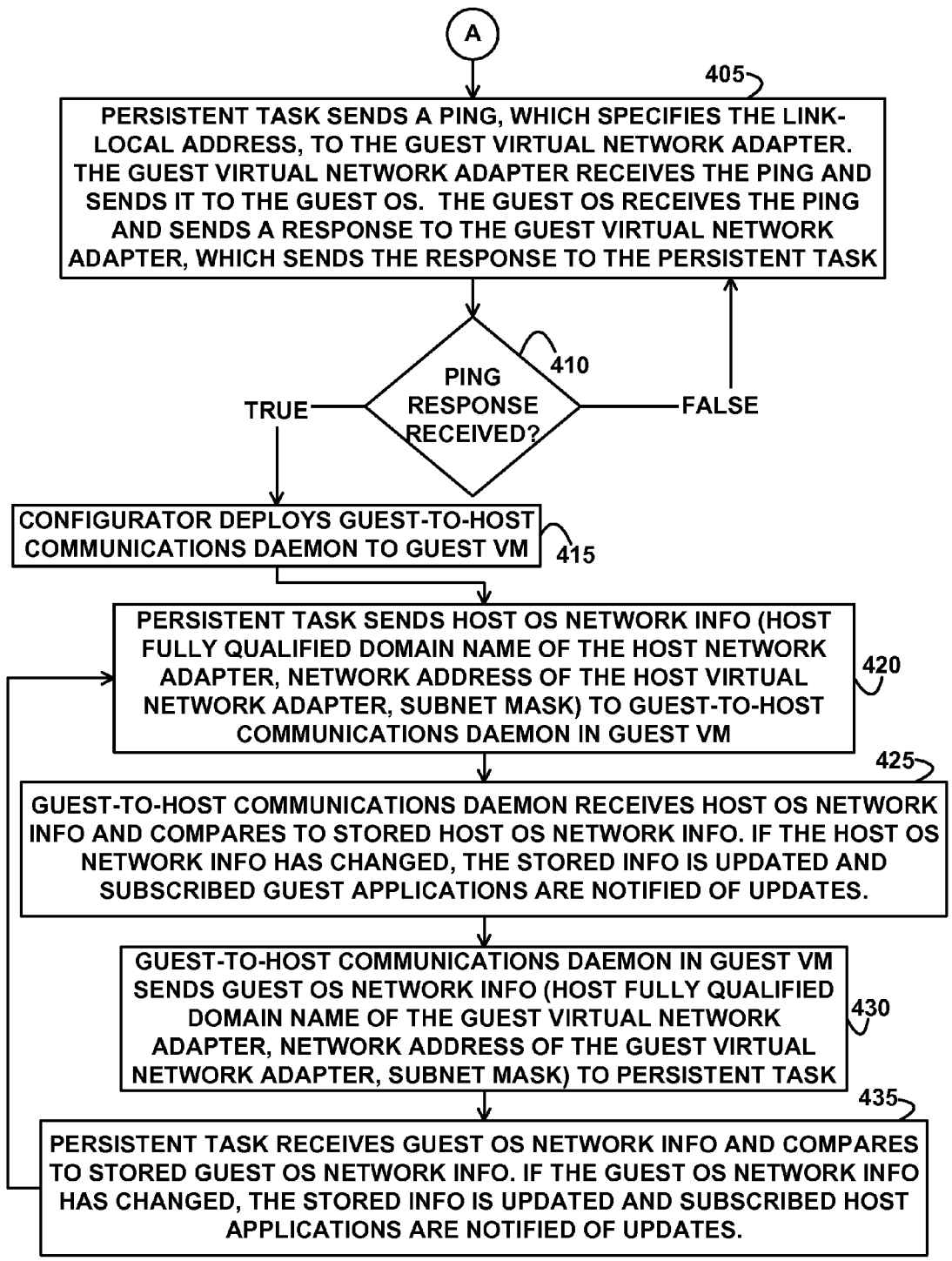
FIG. 4 depicts a flowchart of example processing for communication of network information, according to an embodiment of the invention.

FIGS. 3 and 4 depict flowcharts of example processing for deployment of virtual machines, connection via a link-local address, and communication of network information, according to an embodiment of the invention. The logic of FIGS. 3 and 4 may be invoked any number of times, once for each guest virtual machine. Control begins at block 300 of FIG. 3. Control then continues to block 305 where the configurator 215 receives a request to deploy a guest virtual machine from an administrator via a user interface at the user I/O device 121 or from an application. Control then continues to block 310 where the configurator 215 requests that the virtualization technology 245 create a MAC address that identifies the guest virtual network adapter assigned to the guest virtual machine. The virtualization technology 245 creates the guest MAC address 292 and stores the guest MAC address 292 to the virtual machine configuration data 235. The configurator 215 reads the guest MAC address 292 from the virtual machine configuration data 235.

Control then continues to block 315 where the configurator 215 calculates the link-local address 220 from the guest MAC address 292. In an embodiment, the configurator 215 calculates the link-local address 220 from the guest MAC address 292 as follows: 1) the configurator 215 inserts the hex digits 0xff-fe between the third and fourth byte of the guest MAC address 292; 2) the configurator 215 complements the Universal/Local bit of the guest MAC address 292, which the second low-order bit of the first byte of the guest MAC address 292, e.g., if the Universal/Local bit is 1, the configurator 215 changes it to 0, and if it is a 0, the configurator 215 changes it to 1; 3) the configurator 215 adds the link-local fe80:: subnet prefix. For example, the guest MAC address 292 "52:54:00:7F:C2:20" becomes link-local address "fe80::5054:ff:fe:7f:c220." In other embodiments, any appropriate technique may be used for converting the guest MAC address 292 to a link-local address 220.

Control then continues to block 320 where the configurator 215 deploys the guest virtual machine and installs the guest operating system 275 or 276. The configurator 215 deploys the guest virtual machine by installing the guest virtual machine, setting configuration parameters, and starting the execution of the guest virtual machine on the processor 101. The configurator 215 installs the guest operating system 275 or 276 by setting configuration parameters for the guest operating system 275 and 276 and starting the execution of the guest operating system 275 and 276 on the processor 101. The following is a general method used to communicate between the host and guest operating systems using a communication channel. The configurator 215 uses the guest link-local address 220 to connect to the guest operating system 275 and 276, via sending frames of packets and/or data that specify the link-local address 220 to the host virtual network adapter 240, which sends the frames to the guest virtual network adapter, which sends the frames to the guest operating system 275 or 276. Control then continues to block 325 where the guest operating system 275 or 276 uses the link-local address 220 to connect to the host operating system, via sending frames that specify the link-local address 220 to the guest virtual network adapter, which sends the frames to the host virtual network adapter, which sends the frames to the host operating system.

Control then continues to block 405 of FIG. 4 where the host persistent task 210 sends a ping, which specifies the link-local address 220, to the guest virtual network adapter identified by the link-local address 220. The guest virtual network adapter receives the ping and sends it to the guest operating system 275 or 276. The guest operating system receives the ping and sends a response to the guest virtual network adapter, which sends the response to the host persistent task 210. In an embodiment, a ping is an echo request message, or a message that requests a response.

Control then continues to block 410 where the host persistent task 210 determines whether the host persistent task 210 has received the ping response. If the determination at block 410 is true, then the host persistent task 210 has received the ping response, so control continues to block 415 where the configurator 215 deploys the guest-to-host communications daemon 277 or 278 to the guest virtual machine. Control then continues to block 420 where the host persistent task 210 sends the host operating system network information (host fully qualified domain name of the host network adapter, network address of the host virtual network adapter, subnet mask) to the guest-to-host communications daemon 277 or 278 in the guest virtual machine.

Control then continues to block 425 where the guest-to-host communications daemon 277 or 278 receives the host operating system network information and compares the received host operating system network information to the stored host operating system network information. If the host operating system network information has changed (the received and stored information are different), then the guest-to-host communications daemon 277 or 278 updates the stored host operating system network information with the received host operating system network information and notifies the subscribed guest applications of the update and the received host operating system network information. The guest-to-host communications daemon 277 or 278 updates entries for the host operating system 205 in a local host table and/or local DNS (Domain Name System), enabling the guest applications 281 or 282 to use host names for communicating with the host operating system 205. If the host operating system network information has not changed (the received and stored information are identical), then the guest-to-host communications daemon 277 or 278 does not update the stored host operating system network information with the received host operating system network information and does not notify the subscribed guest applications of an update.

Control then continues to block 430 where the guest-to-host communications daemon 277 or 278 in the guest virtual machine sends the guest operating system network information (the host fully qualified domain name of the guest virtual network adapter, the network address of the guest virtual network adapter, and a subnet mask) to the host persistent task 210.

Control then continues to block 435 where the host persistent task 210 receives the guest operating system network information and compares it to the stored guest operating system network information. If the guest operating system network information has changed (the received and stored information are different), then the host persistent task 210 updates the stored guest operating system network information with the received guest operating system network information and notifies the subscribed host applications 250 of the update and the received guest operating system network information. The host persistent task 210 updates entries for the guest operating system 275 or 276 in a local host table and/or local DNS (Domain Name System), enabling the host applications 250 to use host names for communicating with the guest operating system 275 or 276. If the guest operating system network information has not changed (the received and stored information are identical), then the host persistent task 210 does not update the stored guest operating system network information with the received guest operating system network information and does not notify the subscribed host applications 250 of an update. Control then returns to block 420 after an appropriate delay, as previously described above.

If the determination at block 410 is false, then the host persistent task 210 has not received the ping response, so control returns to block 405 where the host persistent task 210 sends another ping to the guest virtual network adapter, as previously described above. In an embodiment, the host persistent task 210 waits for a time period before returning to block 405, allowing time for the guest operating system 275 or 276 to boot or recover from errors.

Figure 5:
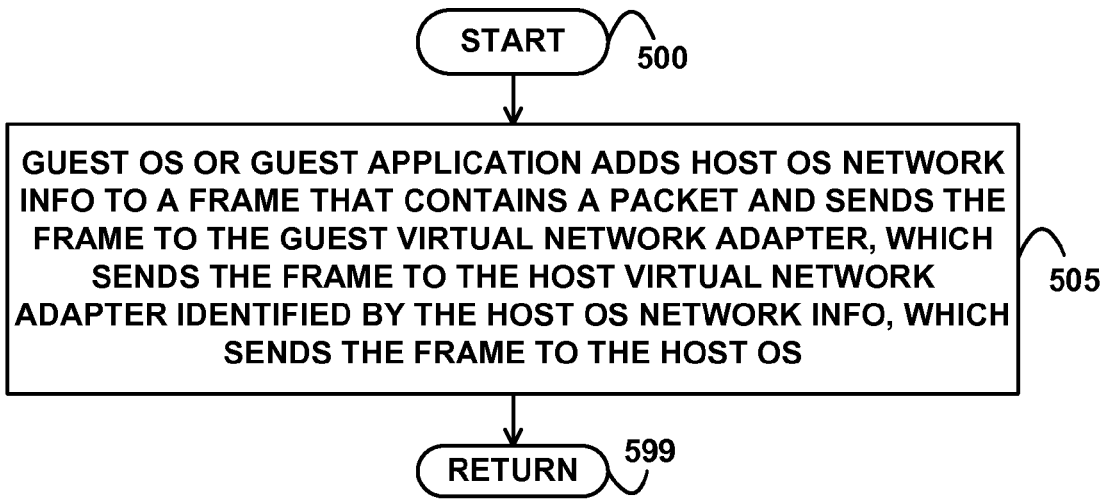
FIG. 5 depicts a flowchart of example processing for packet communication from a guest operating system to a host operating system, according to an embodiment of the invention.

FIG. 5 depicts a flowchart of example processing for packet communication from a guest operating system to a host operating system, according to an embodiment of the invention. In an embodiment, the logic of FIG. 5 executes repeatedly for the same or different packets of data. Control begins at block 500. Control then continues to block 505 where the guest operating system or guest application in the guest virtual machine adds the host operating system network information that is stored in the guest virtual machine to a frame that contains a packet of data and sends the frame to the guest virtual network adapter in the guest virtual machine, which sends the frame to the host virtual network adapter identified by the host operating system network information, which sends the frame to the host operating system 205. The host operating system 205 receives and processes or stores the frame to memory. Control then continues to block 599 where the logic of FIG. 5 returns.

Figure 6:
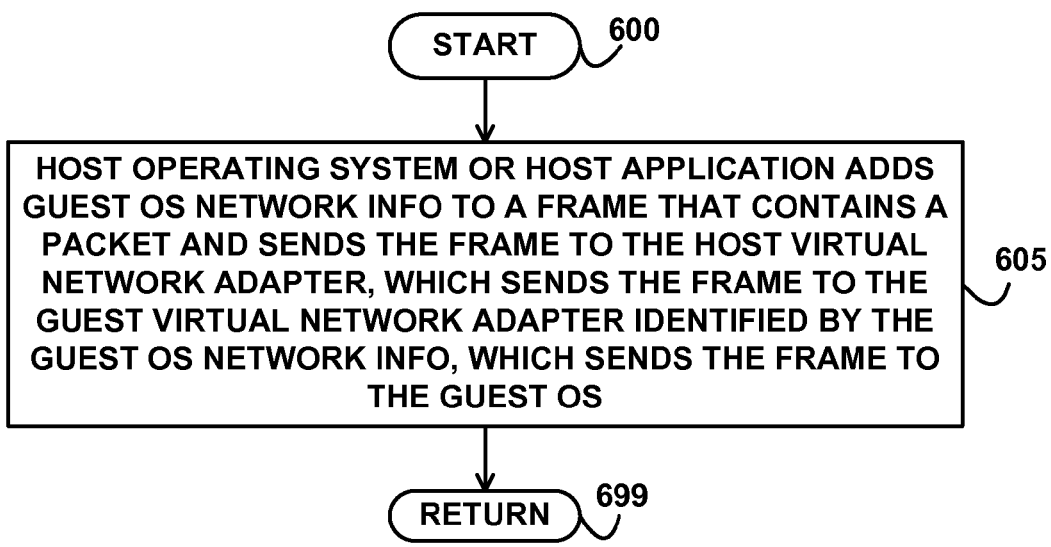
FIG. 6 depicts a flowchart of example processing for packet communication from a host operating system to a guest operating system, according to an embodiment of the invention.

FIG. 6 depicts a flowchart of example processing for packet communication from a host operating system to a guest operating system, according to an embodiment of the invention. In an embodiment, the logic of FIG. 6 executes repeatedly for the same or different packets of data. Control begins at block 600. Control then continues to block 605 where the host operating system 205 or the host application 250 adds the guest operating system network information (that identifies the guest virtual network adapter that is in the guest virtual machine that is the intended target of the packet or that comprises the guest operating system 275 and 276 or guest application that is the intended target of the packet) to a frame that contains a packet of data and sends the frame to the host virtual network adapter, which sends the frame to the guest virtual network adapter identified by the guest operating system network information, which sends the frame to the guest operating system. The guest operating system receives and processes the frame, stores the frame in memory, or sends the frame to the intended target of the guest application 281 or 282 in the same virtual machine. Control then continues to block 699 where the logic of FIG. 6 returns.

Figure 7:
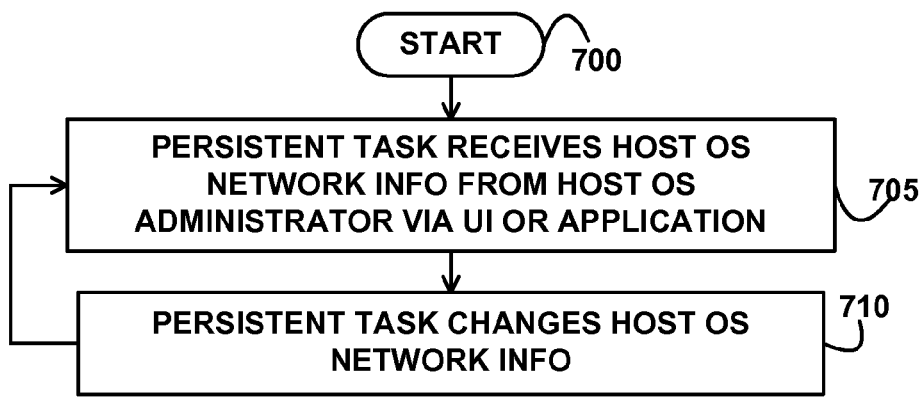
FIG. 7 depicts a flowchart of example processing for changing host operating system network information, according to an embodiment of the invention.

FIG. 7 depicts a flowchart of example processing for changing host operating system network information, according to an embodiment of the invention. Control begins at block 700. Control then continues to block 705 where the host persistent task 210 receives the host operating system network information from the host operating system administrator via a user interface or from a host application 250. Control then continues to block 710 where the host persistent task 210 changes the host operating system network information by storing the received host operating system network information to the host operating system network information 270. Control then returns to block 705 where the host persistent task 210 receives the same or different host network information from the host operating system administrator or host application 250, as previously described above.

Figure 8:
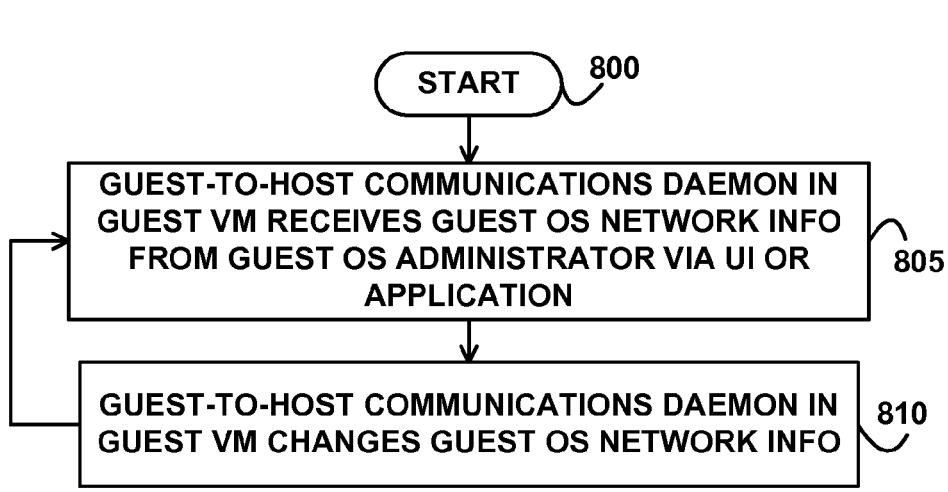
FIG. 8 depicts a flowchart of example processing for changing guest operating system network information, according to an embodiment of the invention.

FIG. 8 depicts a flowchart of example processing for changing guest operating system network information, according to an embodiment of the invention. Control begins at block 800. Control then continues to block 805 where the guest-to-host communications daemon 277 or 278 in the guest virtual machine receives the guest network information from the guest operating system administrator via a user interface or from a guest application. Control then continues to block 810 where the guest-to-host communications daemon 277 or 278 in the guest virtual machine changes the stored guest operating system network information by storing the received guest operating system network information to the guest operating system network information 283 or 284 in the guest virtual machine. Control then returns to block 805 where the guest-to-host communications daemon 277 or 278 in the guest virtual machine receives the same or different guest network information from the guest operating system administrator or guest application, as previously described above.

Figure 9:
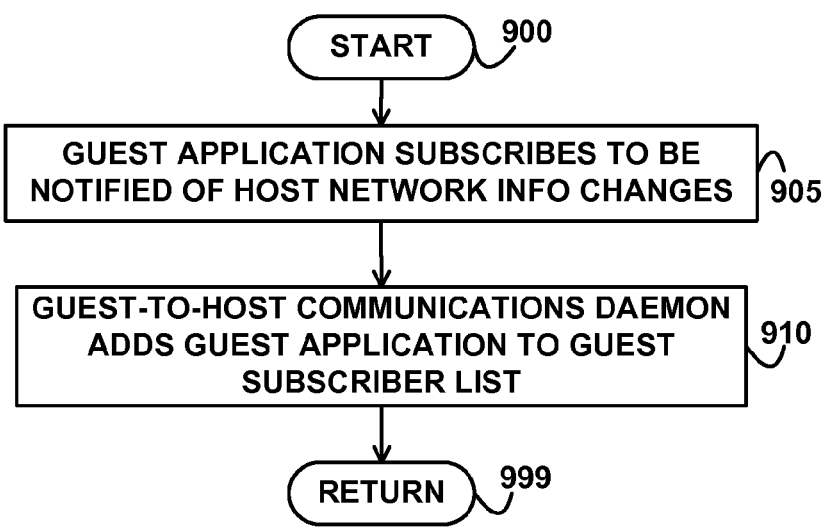
FIG. 9 depicts a flowchart of example processing for subscribing a guest application for notification of host network information changes, according to an embodiment of the invention.

FIG. 9 depicts a flowchart of example processing for subscribing a guest application for notification of host network information changes, according to an embodiment of the invention. Control begins at block 900. Control then continues to block 905 where the guest application 281 or 282 subscribes to be notified of host network information changes, by sending a subscription request to the guest-to-host communications daemon 277 or 278. Control then continues to block 910 where the guest-to-host communications daemon 277 or 278 receives the subscription request, and in response, adds an identifier of the requesting guest application 281 or 282 to the guest subscriber list 287 or 288. Control then continues to block 999 where the logic of FIG. 9 returns.

Figure 10:
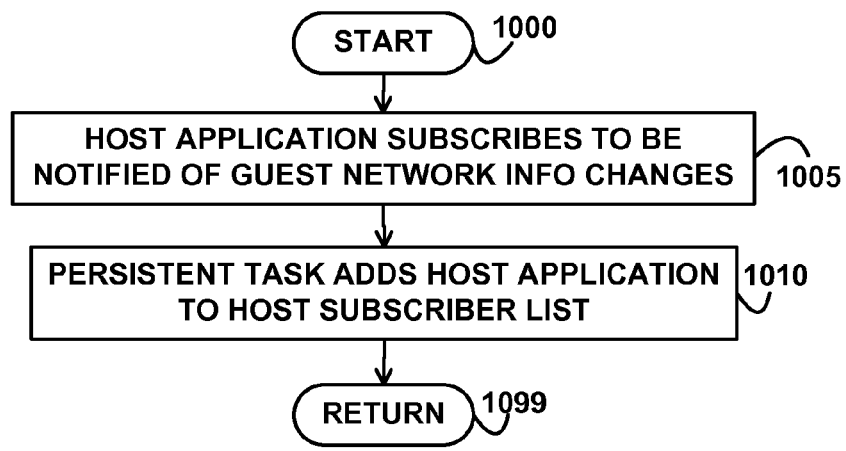
FIG. 10 depicts a flowchart of example processing for subscribing a host application for notification of guest network information changes, according to an embodiment of the invention.

FIG. 10 depicts a flowchart of example processing for subscribing a host application for notification of guest network information changes, according to an embodiment of the invention. Control begins at block 1000. Control then continues to block 1005 where the host application 250 subscribes to be notified of guest network information changes, by sending a subscription request to the host persistent task 210. Control then continues to block 1010 where the host persistent task 210 receives the subscription request, and in response, adds an identifier of the requesting host application 250 to the host subscriber list 230. Control then continues to block 1099 where the logic of FIG. 10 returns.

Figure 11:
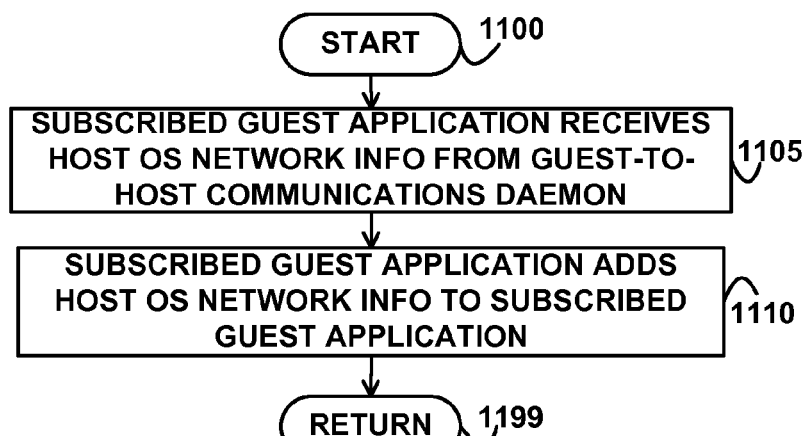
FIG. 11 depicts a flowchart of example processing for notifying a guest application of host network information changes, according to an embodiment of the invention.

FIG. 11 depicts a flowchart of example processing for notifying a guest application of host network information changes, according to an embodiment of the invention. Control begins at block 1100. Control then continues to block 1105 where the subscribed guest application 281 or 282 receives the host operating system network information from the guest-to-host communications daemon 277 or 278 (which was sent by the logic of FIG. 4). Control then continues to block 1110 where the subscribed guest application 281 or 282 stores the host operating system network information to the memory of the subscribed guest application 281 or 282, as the host operating system network information 289 or 290. Control then continues to block 1199 where the logic of FIG. 11 returns.

Figure 12:
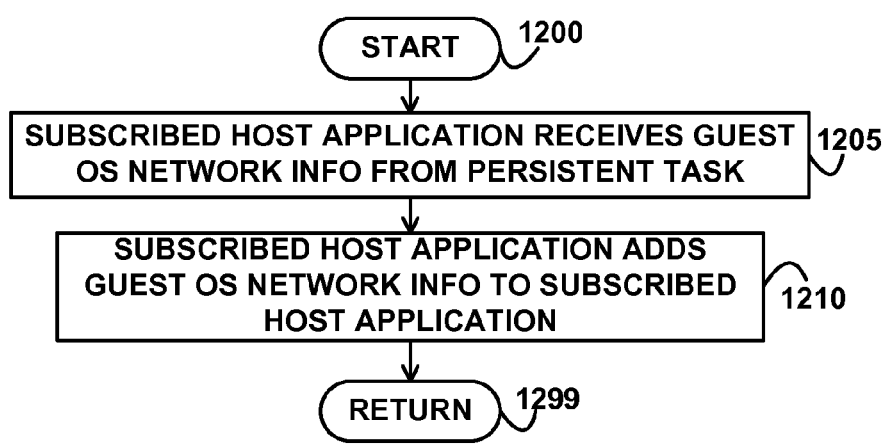
FIG. 12 depicts a flowchart of example processing for notifying a host application of guest network information changes, according to an embodiment of the invention.

FIG. 12 depicts a flowchart of example processing for notifying a host application of guest network information changes, according to an embodiment of the invention. Control begins at block 1200. Control then continues to block 1205 where the subscribed host application 250 receives guest operating system network information from the host persistent task 210 (which was sent by the logic of FIG. 4). Control then continues to block 1210 where the subscribed host application 250 stores the received guest operating system network information to the memory of the subscribed host application 250, as the guest operating system network information 294. Control then continues to block 1299 where the logic of FIG. 12 returns.

In an embodiment, the logic of FIGS. 5, 6, 7, 8, 9, 10, 11, and 12 execute concurrently, substantially concurrently, or interleaved on the same or a different processor as the logic of FIG. 4, so that a guest virtual machine 225 or 226 sends different frames via different, updated, host operating system network information that identify the same host virtual network adapter 240, and the host operating system 205 sends different frames via different, updated, guest operating system network information that identify the same guest virtual network adapter.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention. Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense.

What is claimed is:

1. A method comprising:

receiving, at a guest operating system that executes in a computer, first host network information that identifies a host virtual network adapter that executes in the computer, wherein the first host network information further uniquely identifies the host virtual network adapter in a network connected to the computer;

sending, from the guest operating system, a first frame that comprises the first host network information to a guest virtual network adapter that executes in the computer, wherein the guest virtual network adapter sends the first frame to the host virtual network adapter identified by the first host network information in the first frame;

receiving, at the guest operating system in the computer, second host network information that identifies the host virtual network adapter, wherein the second host network information further uniquely identifies the host virtual network adapter in the network;

sending, from the guest operating system, a second frame that comprises the second host network information to the guest virtual network adapter, wherein the guest virtual network adapter sends the second frame to the host virtual network adapter identified by the second host network information in the second frame, wherein the host virtual network adapter sends the first frame and the second frame to a host operating system that executes in the computer, wherein the host operating system that executes in the computer uses the host virtual network adapter to communicate to a guest virtual machine that executes in the computer and that comprises the guest operating system, and wherein the host virtual network adapter comprises instructions that execute on a processor in the computer;

receiving, at a host task that executes in a computer, first guest network information that identifies the guest virtual network adapter, wherein the first guest network information further uniquely identifies the guest virtual network adapter in the network;

sending, from the host task, a third frame that comprises the first guest network information to the host virtual network adapter, wherein the host virtual network adapter sends the third frame to the guest virtual network adapter identified by the first guest network information in the third frame; and receiving, at the host task, second guest network information that identifies the guest virtual network adapter, wherein the second guest network information further uniquely identifies the guest virtual network adapter in the network, wherein the host virtual network adapter is separate from the guest virtual network adapter, and wherein the host virtual network adapter is separate from the host operating system.

2. The method of claim 1, further comprising:
if the first host network information and the second host network information are different, notifying a guest application of the second host network information.

3. The method of claim 1, further comprising:
sending, from the host task, a fourth frame that comprises the second guest network information to the host virtual network adapter, wherein the host virtual network adapter sends the fourth frame to the guest virtual network adapter identified by the second guest network information in the fourth frame.

4. The method of claim 3, further comprising:
if the first guest network information and the second guest network information are different, notifying a host application of the second guest network information.

5. A non-transitory computer-readable storage medium encoded with instructions, wherein the instructions when executed comprise:

receiving, at a guest operating system that executes in a computer, first host network information that identifies a host virtual network adapter that executes in the computer, wherein the first host network information further uniquely identifies the host virtual network adapter in a network connected to the computer;

sending, from the guest operating system, a first frame that comprises the first host network information to a guest virtual network adapter that executes in the computer, wherein the guest virtual network adapter sends the first frame to the host virtual network adapter identified by the first host network information in the first frame;

receiving, at the guest operating system in the computer, second host network information that identifies the host virtual network adapter, wherein the second host network information further uniquely identifies the host virtual network adapter in the network;

sending, from the guest operating system, a second frame that comprises the second host network information to the guest virtual network adapter, wherein the guest virtual network adapter sends the second frame to the host virtual network adapter identified by the second host network information in the second frame, wherein the host virtual network adapter sends the first frame and the second frame to a host operating system that executes in the computer, wherein the host operating system that executes in the computer uses the host virtual network adapter to communicate to a guest virtual machine that executes in the computer and that comprises the guest operating system, and wherein the host virtual network adapter comprises instructions that execute on a processor in the computer;

receiving, at a host task that executes in a computer, first guest network information that identifies the guest virtual network adapter, wherein the first guest network information further uniquely identifies the guest virtual network adapter in the network;

sending, from the host task, a third frame that comprises the first guest network information to the host virtual network adapter, wherein the host virtual network adapter sends the third frame to the guest virtual network adapter identified by the first guest network information in the third frame; and receiving, at the host task, second guest network information that identifies the guest virtual network adapter, wherein the second guest network information further uniquely identifies the guest virtual network adapter in the network, wherein the host virtual network adapter is separate from the guest virtual network adapter, and wherein the host virtual network adapter is separate from the host operating system.

6. The non-transitory computer-readable storage medium of claim 5, further comprising:
if the first host network information and the second host network information are different, notifying a guest application of the second host network information.

7. The non-transitory computer-readable storage medium of claim 5, further comprising:

sending, from the host task, a fourth frame that comprises the second guest network information to the host virtual network adapter, wherein the host virtual network adapter sends the fourth frame to the guest virtual network adapter identified by the second guest network information in the fourth frame.

8. The non-transitory computer-readable storage medium of claim 7, further comprising:
if the first guest network information and the second guest network information are different, notifying a host application of the second guest network information.

9. A computer, comprising:
a processor; and
memory communicatively coupled to the processor, wherein the memory is encoded with instructions, wherein the instructions when executed on the processor comprise:
receiving, at a guest operating system that executes in the computer, first host network information that identifies a host virtual network adapter that executes in the computer, wherein the first host network information further uniquely identifies the host virtual network adapter in a network connected to the computer,
sending, from the guest operating system, a first frame that comprises the first host network information to a guest virtual network adapter that executes in the computer, wherein the guest virtual network adapter sends the first frame to the host virtual network adapter identified by the first host network information in the first frame,
receiving, at the guest operating system in the computer, second host network information that identifies the host virtual network adapter, wherein the second host network information further uniquely identifies the host virtual network adapter in the network,
sending, from the guest operating system, a second frame that comprises the second host network information to the guest virtual network adapter, wherein the guest virtual network adapter sends the second frame to the host virtual network adapter identified by the second host network information in the second frame, wherein the host virtual network adapter sends the first frame and the second frame to a host operating system that executes in the computer, wherein the host operating system that executes in the computer uses the host virtual network adapter to communicate to a guest virtual machine that executes in the computer and that comprises the guest operating system, and wherein the host virtual network adapter comprises instructions that execute on the processor in the computer,
receiving, at a host task that executes in a computer, first guest network information that identifies the guest virtual network adapter, wherein the first guest network information further uniquely identifies the guest virtual network adapter in the network,
sending, from the host task, a third frame that comprises the first guest network information to the host virtual network adapter, wherein the host virtual network adapter sends the third frame to the guest virtual network adapter identified by the first guest network information in the third frame, and
receiving, at the host task, second guest network information that identifies the guest virtual network adapter, wherein the second guest network information further uniquely identifies the guest virtual network adapter in the network, wherein the host virtual network adapter is separate from the guest virtual network adapter, and wherein the host virtual network adapter is separate from the host operating system.

10. The computer of claim 9, wherein the instructions further comprise:
if the first host network information and the second host network information are different, notifying a guest application of the second host network information.

11. The computer of claim 9, wherein the instructions further comprise:
sending, from the host task, a fourth frame that comprises the second guest network information to the host virtual network adapter, wherein the host virtual network adapter sends the fourth frame to the guest virtual network adapter identified by the second guest network information in the fourth frame.

12. The computer of claim 11, wherein the instructions further comprise: if the first guest network information and the second guest network information are different, notifying a host application of the second guest network information.

* * * * *